United States Patent [19]

Pendola

[11] Patent Number: 4,586,229

[45] Date of Patent: May 6, 1986

[54] BUSHING BEARING EXTRACTOR

[76] Inventor: Michael F. Pendola, 202-32 47th Ave., Bayside, N.Y. 11361

[21] Appl. No.: 773,256

[22] Filed: Sep. 6, 1985

[51] Int. Cl.⁴ ............................................ B23P 19/04

[52] U.S. Cl. ..................................................... 29/252

[58] Field of Search ......................... 29/252, 263, 264

[56] References Cited

U.S. PATENT DOCUMENTS

| | | | |
|---|---|---|---|
| 1,381,101 | 6/1921 | Albertson | 29/263 |
| 4,240,191 | 12/1980 | Schroyer | 29/252 |
| 4,369,569 | 1/1983 | Armstrong et al. | 29/252 |

*Primary Examiner*—Robert C. Watson
*Attorney, Agent, or Firm*—Bauer & Amer

[57] ABSTRACT

After attachment of a tap member or the like to the bushing bearing to be removed, the inventive extractor hereof uses to advantage a pressure fluid, such as grease, to force the tap member with its attached bearing in an exiting direction from its blind hole, and if the force thereof is inadequate for this purpose, then provides for advancing the tap member, also in an exiting direction, along the threads of a rotated operative member disposed centrally of the tap member, said operative member being held by the pressure fluid against longitudinal movement so that the tap member and not said operative member partakes of this movement. Thus, the pressure fluid in effect serves as a "cushion" for the applied forces and, in this way, contributes to extraction of the bushing bearing without damage being caused to the bottom wall of the blind hole.

5 Claims, 3 Drawing Figures

BUSHING BEARING EXTRACTOR

The present invention relates to improvements in a device for removing or extracting a damaged or worn bushing bearing from its typical operative force fit condition in a blind hole, the improvements more particularly enabling the use of pressure fluid, such as grease, to effectuate said extraction, rather than relying on strictly mechanical means as is presently the case in the prior art.

As understood and as exemplified by the bearing extractor of U.S. Pat. No. 1,381,101, it is already known that by threadably engaging a tap member or the like to the bearing, that the tap member then constitutes a convenient component by which force can be exerted to overcome the frictional force containing the bearing in the blind hole and, in this way, extracting the bearing preparatory to its replacement. In the referred to patented extractor, the tap member has an internally threaded central bore in which a wrench with a threaded shank is disposed such that the remote end of the shank is brought to bear against the bottom of the blind hole and rotation of the wrench handle causes advancement of the tap member, with its attached bearing, along the threaded shank in an exiting direction from the blind hole. While extracting the bearing using a mechanical advantage as just described is generally effective, there is occasionally some difficulty encountered when the frictional force holding the bearing in place is of a large magnitude, and often the force exerted by the end of the shank against the bottom wall of the blind hole causes damage to this wall.

Broadly, it is an object of the present invention to provide an improved bushing bearing extractor that uses a pressure fluid in its operational mode to thereby overcome the foregoing and other shortcomings of the prior art.

More particularly, it is an object to generate using the pressure of a fluid, such as grease, the force necessary to dislodge the bushing bearing, and if this is not adequate to increase this applied force by mechanical means, but without damaging the walls bounding the blind hole containing the bushing bearing.

An extractor for removing a bushing bearing from its operative position in a cylindrical opening having a surface closing one end thereof demonstrating objects and advantages of the present invention includes a first tap member having external threads that are used to establish threaded engagement with the bushing bearing, said tap member also having an internally threaded throughbore bounding a pressure chamber in communication with the end surface of the cylindrical opening. A second operative member having external threads is then threadably engaged in the internally threaded throughbore of the tap member so as to form a closure for the pressure chamber, this member also having a throughbore centrally thereof in communication with the pressure chamber. At least one check valve is provided in the throughbore of the second operative member so as to permit the directional flow of pressure fluid only into the pressure chamber and obviating any reverse flow therefrom. In the next step in the operational mode of the extractor, a volume of pressure fluid is injected into the pressure chamber to apply pressure against the cylindrical opening end surface to initially cause movement in the attached tap member and bushing bearing in an exiting direction from the cylindrical opening. If this dislodging force is insufficient, it is herein provided as a supplement thereto, that the second operative member be threadably rotated to cause the advancement of the tap member with its attached bushing bearing along its threads and thus also in an exiting direction from the cylindrical opening and in this way both of the applied forces are effective to cause the extraction of the bushing bearing, prepartory to its replacement, and without damaging the walls of the blind cylindrical opening of the bearing.

The above brief description, as well as further objects, features and advantages of the present invention, will be more fully appreciated by reference to the following detailed description of a presently preferred, but nevertheless illustrative embodiment in accordance with the present invention, when taken in conjunction with the accompanying drawings, wherein.

Figure 1:
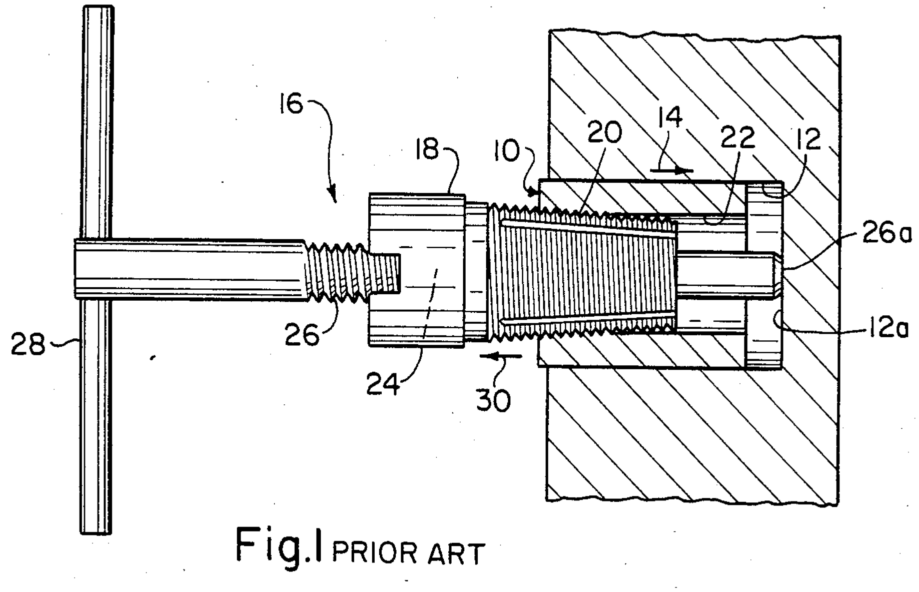
Fig.1 PRIOR ART
FIG. 1 is a side elevational view of a prior art bushing bearing extractor of which the within extractor is a significant improvement.
Figure 2:
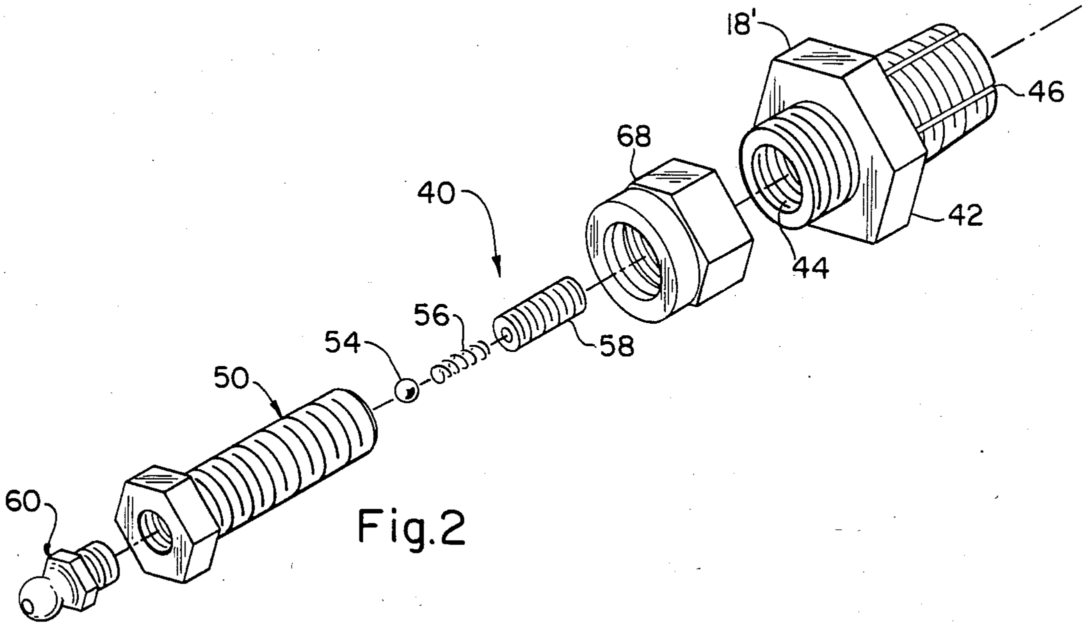
FIG. 2 is a perspective view of the improved extractor in accordance with the present invention, in unassembled condition.
Figure 3:
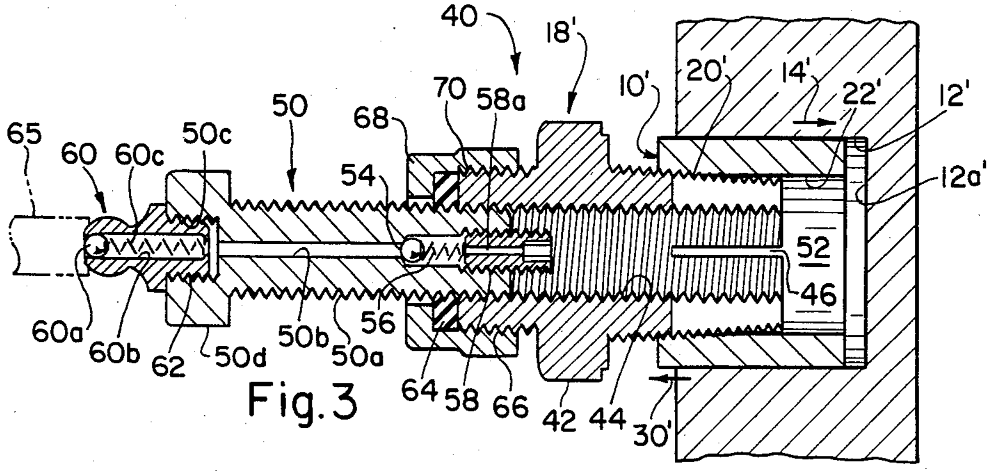
FIG. 3 is a side elevational view in longitudinal cross section of the inventive extractor hereof, in its assembled condition.

It is already well known, as illustrated and described, for example, in prior U.S. Pat. No. 1,381,101 and also illustrated in FIG. 1 hereof, that an appropriate means, usually of a mechanical nature, is necessary for the removal or extraction of a bushing bearing 10 from its typical operative condition located in a blind hole 12. More particularly, removal of the bearing 10 for a replacement bearing must overcome the frictional engagement at the interface, as at 14, between the cylindrical external surface of the bearing 10 and the cylindrical wall of the blind hole 12. To overcome the frictional resistance 14 use is made in the prior art of the extractor, generally designated 16 in FIG. 1. Briefly, extractor 16 includes a tap member 18 that is threadably engaged, as at 20, to the internal cylindrical surface 22 of the bearing 10. Tap member 18 includes a threaded central bore 24 which threadably receives the threaded shank 26 of a wrench member which is rotated within the tap member 18 using a cross bar or handle 28. Thus, and operating in a well understood manner, the threaded shank 26 is threadably inserted through the tap member 18 until the shank end **26*a* contacts the bottom surface 12*a* of the blind hole 12, and thereafter continued rotation of the threaded shank 26 within the tap member 18 results in the tap member 18 being advanced along the threads of the shank 26 in an exiting direction 30. Since the bushing bearing 10 is threadably engaged at 20 to the tap member 18, it is, of course, carried along with the tap member 18 out of the blind hole 12**.

While the operation of the prior art extractor 16 as above described is generally effective, it is not always successfully and effectively used in extracting bushing bearings in which the frictional force 14, which resists extraction, is extremely large. Moreover, in these difficult circumstances, often the shank end **26*a* causes a depression or a rupture in the end wall 12*a*** during the extraction of the bushing bearing.

Overcoming the foregoing and other shortcomings of a strictly mechanical extractor 16 as exemplified by that described in FIG. 1, is the within extractor, generally designated 40, which is of a hydraulic nature. That is, extractor 40 has many of the mechanical components already described in connection with the prior art extractor and these similar components are designated by similar but primed reference numerals, and also include structural features enabling the use of a pressure fluid to supplement the force generated in extracting the bushing bearing from its blind hole. Thus, let it be assumed as already described in connection with FIG. 1, that it is necessary to remove the cylindrical bushing bearing 10′ from its operative position in a cylindrical opening 12′ having a surface **12*a* ′ closing one end thereof. The first step includes establishing threaded engagement, as at 20′, with the internal surface 22′ of the bushing bearing 10′ using an externally threaded tap member 18′, which, more particularly, has a nut configuration 42 formed thereon to facilitate rotating the tap member 18′ when establishing the threaded engagement 20′ with the bushing bearing 10′. Additionally, tap member 18′ also includes an internally threaded throughbore 44 and the usual slots 46 which, in a well understood manner, allow for radial size changes in the tapping member 18′ during the time that it is cutting threads as at 20′, in the bushing bearing surface 22′. However, in accordance with the present invention, the longitudinal size of the slots 46 are selectively shorter than their prior art counterparts so that each slot does not extend beyond the opening of the bushing bearing 10′** for a reason which will be more readily understood as the description proceeds.

A component utilized in the inventive extractor 40 which was not utilized in the prior art extractor 16 is a second operative component or member 50 having external threads **50*a* by which it is threadably inserted and engaged to the internally threaded throughbore 44 of the tap member 18′. Thus, tap member 18′ when threadably attached as at 20′ to the bushing bearing 10′ forms, in effect, a pressure fluid chamber 52 immediately in front of the end surface 12*a*′ and the member 50 serves as a closure for the chamber 52. Completing the construction of the member 50 is a central throughbore 50*b* and an end check valve consisting of a ball 54 biased into a position closing the central bore 50*b* by a spring 56 that is held in place by an Allen screw 58 which downstream of the check valve 54, 56 has a continuing central throughbore 58*a* in communication with the fluid chamber 52. It is to be noted that the fluid chamber 52 includes not only the area immediately in front of the end surface 12*a*, but also the cylindrical area which is bounded by the internally threaded throughbore 44 of the tap member 18′. In this regard, it is convenient at this location in the description to note that the reason that the slots 46 are of the longitudinal size illustrated is that it is necessary that these slots be entirely within the bushing bearing 10′ when fluid is injected into the chamber 52 so that there is no leakage therefrom, which would be the case if the slots 46 extended beyond the end of the bushing bearing 10′**.

Continuing with the description of the operative member 50, at its end opposite from the check valve 54, 56, this member has a threaded counterbore **50*c* which in practice threadably receives a second check valve 60 in the specific form of a so-called grease fitting. That is, check valve 60 includes a ball 60*a* normally spring biased against the upper opening of a central throughbore 60*b* by a spring 60*c* which is seated in the opening of the bore 60*b* that is swaged at its end so as to contain the spring 60*c*. The grease fitting of check valve 60 is threadably engaged in the threaded counterbore 50*c* of the operative member 50. Thus, pressure fluid can be delivered into the pressure chamber 52 past the one way check valve of the grease fitting 60, through the bore 50*b* past the one way check valve 54, 56, and through the cylindrical central bore 44 of the tap member 18′ into the pressure chamber 52 per se. In practice, this pressure fluid, in the specific form of grease at approximately 2000 lbs. per square inch is delivered from a so-called grease gun 65, of any conventional well known construction and operational mode, along the flow path into the pressure chamber 52 as above described. This pressure fluid, thusly injected into the pressure chamber 52, exerts a force against the end surface 12*a*′ and thus contributes to generating a force causing movement of the tap member 18′ and its attached bushing bearing 10′ in the exiting direction 30′. More particularly, since the two check valves 60*a*, 60*b* and 54, 56 prevent reverse flow in the pressure fluid or grease injected into the chamber 52, the continued delivery of this pressure fluid into the chamber 52 has the desirable effect of a pressure build up therein which tends to cause dislodgement of the bushing bearing 10′ from its operative position in the cylindrical opening 12′**.

Assuming, however, that the pressure at which the grease or pressure fluid is introduced into the chamber 52 is not sufficient to overcome the frictional force 14′, the within inventive extractor 40 has an additional provision for supplementing the force necessary to overcome said friction force 14′. To this end the member 50 has a nut configuration **50*d* formed at one end which is conveniently engaged by a wrench enabling the member 50 to be urged through rotation. Assuming the removal of the grease gun 64 after it has effectively delivered high pressure grease into the chamber 52, and assuming further that the pressure of this fluid has not been sufficient to dislodge the bearing bushing 10′, it should be readily appreciated that rotation of the member 50 within the internally threaded throughbore 44 of the tap member 18′ results in the tap member 18′ with its attached bushing bearing 10′ being advanced in the exiting direction 30′. That is, since the grease in the chamber 52 is essentially non-compressible, member 50′ cannot advance into this pressure fluid and so, therefore, the threaded engagement between the member 50 and tap member 18′ must result in the tap member 18′ advancing along the threads 50*a* of the member 50 in much the same way that there is advancement along the threads of a lead screw in a micrometer or the like. In this way, therefore, the rotation of the member 50 supplements the force exerted by the pressure fluid in the pressure chamber 52 and causes the extraction of the bushing bearing 10′ from the cylindrical opening 12′**.

To obviate any possible leakage of pressure fluid from the chamber 52 during the extraction of the bushing bearing 10′ and particularly any leakage along the threaded engagement between the member 50 and the internal threads 44 of the tap member 18, use is made of a circular seal 64 disposed in encircling relation about the member 50 and adjacent an externally threaded end 66 of the tap member 18′ and held in place by a cap 68 threadably engaged, as at 70, to the tap member threaded end 66.

From the foregoing description it should be readily appreciated that there has been described herein an effective extractor 40 which is capable of removing a bushing bearing 10′ against a highly resistant friction force 14′, but without causing any damage or adverse effect on the bottom wall or surface **12*a*′ of the cylindrical opening 12' which houses the bushing bearing. Additionally, it has been found in practice that the grease introduced into the chamber 52 by its lubricating nature can sometimes permeate the interface between the bushing bearing 10' and the cylindrical wall of the opening 12' along which the friction force 14'** is being exerted and in this manner, also assists in the extraction of the bushing bearing.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. An extractor for removing a bushing bearing from its operative position in a cylindrical opening having a surface closing one end thereof, said extractor comprising a first tap member having external threads in threaded engagement with said bushing bearing and an internally threaded throughbore bounding a pressure chamber in communication with said end surface of said cylindrical opening, a second operative member having external threads threadably engaged in said internally threaded throughbore of said tap member so as to form a closure for said pressure chamber and having a throughbore centrally thereof in communication with said pressure chamber, and at least one check valve in said throughbore of said second operative member so as to permit the directional flow of pressure fluid only into said pressure chamber and obviating any reverse flow therefrom, whereby a volume of pressure fluid is injected into said pressure chamber to apply pressure against said cylindrical opening end surface to initially cause movement in said attached tap member and bushing bearing in an exiting direction from said cylindrical opening, and in supplement thereto said second operative member is also adapted to be threadably rotated to cause the advancement of said tap member with its attached bushing bearing in an exiting direction from said cylindrical opening to thereby cause the extraction thereof.

2. An extractor as claimed in claim 1, wherein said check valve is more particularly embodied in a grease fitting disposed in an end of said second operative member, and said pressure fluid is grease injected through said grease fitting from a grease-dispensing device.

3. An extractor as claimed in claim 2, wherein a second check valve is provided in said opposite end of said second operative member to ensure containment of said grease in said pressure chamber.

4. An extractor as claimed in claim 3, including a nut configuration on said second operative member to facilitate the rotation thereof incident to causing the exiting advancement of said tap member therealong in response to said rotation.

5. An extractor as claimed in claim 4, including a circular seal disposed in encircling relation about said second operative member, and a cap for confining said seal in sealing relation adjacent the end of said tap member, whereby said seal obviates leakage of pressure fluid along said threaded engagement of said second operative member internally of said tap member, and thus out of said pressure chamber.

* * * * *